United States Patent [19]

Park et al.

[11] Patent Number: 5,028,651

[45] Date of Patent: Jul. 2, 1991

[54] HEAT RESISTANT AND FLAME RETARDANT RESIN COMPOSITION

[75] Inventors: Bong H. Park; Bong G. Yi; Jin N. Yoo, all of Chungcheongnam-do, Rep. of Korea

[73] Assignee: Lucky, Ltd., Seoul, Rep. of Korea

[21] Appl. No.: 258,207

[22] Filed: Oct. 14, 1988

[30] Foreign Application Priority Data

Oct. 16, 1987 [KR] Rep. of Korea .................... 87-11488

[51] Int. Cl.$^5$ .......................... C08K 3/20; C08K 5/03; C08L 51/04; C08L 63/00
[52] U.S. Cl. .................................. 524/409; 524/341; 524/371; 524/373; 525/65
[58] Field of Search ............... 524/409, 341, 371, 373; 525/65

[56] References Cited

U.S. PATENT DOCUMENTS 3,923,922 12/1975 Grant .................................... 525/65
4,742,104 4/1988 Linder et al. ....................... 524/409

*Primary Examiner*—Jacob Ziegler
*Attorney, Agent, or Firm*—Brumbaugh, Graves, Donohue & Raymond

[57] ABSTRACT

The present invention provides a novel resin composition possessing excellent heat resistance and flame retardance without the flame dripping during combustion. The claimed resin composition comprises a matrix resin composed of two types of resin components with improved heat resistance; an organic flame retardant; antimony trioxide; and a thermoplastic phenoxy resin.

11 Claims, No Drawings

HEAT RESISTANT AND FLAME RETARDANT RESIN COMPOSITION

BACKGROUND OF THE INVENTION

The present invention relates to a novel resin composition having excellent heat resistance and flame retardance without flame dripping during combustion.

Recently, the demand for ABS (acrylonitrile-butadiene-styrene) resins possessing both heat resistance and flame retardance without the flame dripping phenomenon during combustion has rapidly increased. Use of ABS resins has greatly increased, from application in all kinds of household electric appliances to high precision industries such as computer monitor housings.

A known method of imparting flame retardant characteristics to ABS resins involves incorporation of polyvinylchloride and/or flame retardants containing halides into ABS resins along with at least one or more inorganic compounds such as antimony trioxide. However, the physical properties of flame retardant ABS manufactured by the above method are decreased to an undesirable level, since the flame retardants must be used in large quantities to both prevent flame dripping and reduce the ignition time to a desirable extent. Moreover, because the prices of most flame retardants are much higher than that of ABS resin, the flame retardant ABS manufactured by above method is economically inefficient.

The present inventors have solved the above problems by incorporating flame retardants and thermoplastic phenoxy resin into ABS resin, which is described in Korean Patent Publication No. 86-974. This resin composition possesses well-balanced physical properties and flame retardance without flame dripping.

Nevertheless, recently flame retardant ABS resins with a higher heat deflection temperature have been required. In order to satisfy such needs, the present invention provides an improved heat deflection temperature compared with the previous flame retardant ABS resin composition without significant deterioration of flame retardance or other physical properties.

SUMMARY OF THE INVENTION

The object of the present invention is to provide a heat resistant and flame retardant resin composition possessing improved heat resistance and better flame retardance without flame dripping.

DETAILED DESCRIPTION OF THE INVENTION

The present invention relates to a heat resistant and flame retardant resin composition comprising (A) a graft copolymer prepared by copolymerizing one or more monomers selected from the group consisting of aromatic monoalkenyl monomers, vinylcyan monomers, alkylester monomers of acrylic acid, alkylester monomers of methacrylic acid, maleic anhydride monomers and N-substituted maleimide monomers, with a rubber component; (B) a copolymer prepared by copolymerizing one or more monomers selected from the group consisting of aromatic monoalkenyl monomers, vinylcyan monomers, alkylester monomers of acrylic acid, and alkylester monomers of methacrylic acid, with a monomer selected from the group consisting of maleic anhydride monomers and N-substituted maleimide monomers; (C) an organic flame retardant; (D) antimony trioxide; and (E) a thermoplastic phonoxy resin; wherein said graft polymer (A) and copolymer (B) form a matrix resin and are present in a ratio of from 5:95 to 95:5 parts by weight.

The graft copolymer of Component (A), used as a component of the matrix resin of the present invention, may be prepared by bulk polymerization, suspension polymerization or emulsion polymerization, or a combination thereof. When emulsion polymerization is used, a polybutadiene latex is first prepared by polymerizing butadiene, after which one or more monomers selected from the group consisting of vinylcyan monomers, styrene monomers, α-methylstyrene monomers, maleic anhydride monomers and N-substituted maleimide monomers are added to graft-polymerize with the polybutadine, thereby forming a multi-component and multiphase ABS resin. Composition of the graft copolymer can be controlled by varying the amount of said components.

The ABS resin obtained from emulsion polymerization has a good luster because the emulsifying agent minutely disperses the rubber latex particles. However, a portion of the emulsifying agent remains in the final product and has a negative effect on the flame retardance of the ABS resin.

On the other hand, when using ABS resins manufactured by bulk polymerization or suspension polymerization, a resin with better flame retardance can be produced because there is no residual emulsifying agent in the final product.

Rubber components used to prepare the graft copolymer of Component (A) include, for example, butadiene type rubbers, isoprene type rubbers, copolymers of diene monomers and styrene monomers, alkylacrylate rubbers, and the like. These are preferably used in an amount of 5 to 70% by weight, more preferably 10 to 60% by weight, of the graft copolymer of Component (A), and preferably have a particle diameter of 0.1 to 1.5 μm, more preferably 0.2 to 0.9 μm.

Monomers which are graft-polymerized with rubber components to prepare Component (A) include, for example, styrene, α-methylstyrene, p-methylstyrene, acrylonitrile, methylmethacrylic acid ester, ethylmethacrylic acid ester, maleic anhydride, arylmaleimide, and the like. These are preferably used in an amount of 30 to 95% by weight, more preferably 40 to 90% by weight, of the graft copolymer of Component (A).

The copolymer of Component (B), which is used as the other component of matrix resin of the present invention, can be easily prepared by bulk polymerization, suspension polymerization, emulsion polymerization, or a combination thereof. Bulk or suspension polymerization is preferred in terms of flame retardance because an emulsifying agent is not needed. The monomers used in Component (B) are the same as the monomers used to prepare component (A), except for the rubber components.

The Components (A) and (B) which form the matrix resin of the composition of the present invention, may be used in a ratio of 5:95 to 95:5 parts by weight, preferably 10:90 to 90:10 parts by weight, more preferably 15:85 to 85:15 parts by weight.

To improve the heat resistance of the flame retardant resin composition, maleic anhydride monomers or N-substituted maleimide monomers are further copolymerized when the matrix resin components are prepared according to the present invention.

The molecular chains of the copolymer prepared in accordance with the method of the present invention become rigid, which decreases their mobility and consequently dramatically improves the heat resistance of the resin composition.

The organic flame retardants containing halogen atoms and antimony trioxide used in the present invention are the same components as used in preparation of conventional flame retardant ABS resin compositions. It is preferable to use these two components together. When only one of the two components is used, satisfactory flame retardance cannot be expected. On the other hand, when the two components are used together, the resulting resin composition exhibits much better flame retardance due to the synergism between the two components.

Numerous studies have been conducted regarding the synergistic mechanism that results in resin compositions with improved flame retardance. However, no clear conclusions have been made.

It is known that, when flammable gas (oxygen radicals, hydroxy radicals and so forth) produced by pyrolysis of resin is oxidized during combustion, halogen compounds produced from the organic flame retardants prevent air from flowing onto the combustion surface and reacting with said flammable gases to convert them into nonflammable gases. Antimony oxide, used as a flame retardant aid, can be converted into an antimony halide, which helps carry halogen compounds to the gas phase of the combustion reaction and captures the reactive radicals and stabilizes them.

The organic flame retardant of the claimed invention includes aromatic compounds containing halogens such as 1,2-bis(2,4,6-tribromophenoxy)ethane, decabromodiphenyl oxide and octabromodiphenyl oxide, or mixtures thereof, aliphatic compounds containing halogens such as 2,2-bis(3,5-dichlorophenyl)propane and bis(2,6-dibromophenyl)methane, and cycloaliphatic compounds containing halogens such as bis(3,5-dichlorophenyl)cyclohexylmethane. Aromatic compounds are preferably used. The amount of the organic flame retardant preferably used is 5 to 40% by weight, more preferably 10 to 30% by weight, of the total amount of the resin composition. When the amount of organic flame retardant is less than 5% by weight of the total amount of the resin composition, sufficient flame retardance cannot be obtained. When the amount of organic flame retardant is over 40% by weight, not only does the organic flame retardant tend to sharply decrease the properties of the resin composition, but the manufacturing process also becomes too costly.

Antimony trioxide is used in the present invention in an amount of 1 to 20% by weight, preferably 1 to 15% by weight, of the total weight of the resin composition. When the amount of antimony trioxide is less than 1% by weight of the total weight of the resin composition, sufficient flame retardance cannot be obtained because synergism of antimony trioxide with the organic flame retardant does not occur. When the amount of antimony trioxide is over 20% by weight, the impact strength of the resin composition decreases to an undesirable level.

Thermoplastic phenoxy resin used in the claimed invention is prepared from epichlorohydrin and 2,2-bis(4-hydroxy-phenol)propane according to the method disclosed in U.S. Pat. No. 3,356,646 incorporated herein by reference. The thermoplastic phenoxy resin has the repeating unit represented by the following formula and a molecular weight of 15,000 to 35,000.

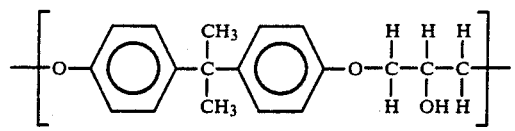

The thermoplastic phenoxy resin gels during combustion when it is used with Components (A) and (B), the organic flame retardant and antimony trioxide, and this prevents flame dripping and greatly increases the fluidity of the resin composition at processing temperatures. The thermoplastic phenoxy resin is used in an amount of 0.01 to 5% by weight, preferably 0.05 to 4% by weight, of the total weight of the resin composition. When the amount of the thermoplastic phenoxy resin is less than 0.01% by weight of the total weight of the resin composition, it will not prevent flame dripping during combustion. When the amount of thermoplastic phenoxy resin is over 5% by weight, the impact strength of the resin composition decreases to a undesirable level.

The heat resistant and flame retardant resin composition may comprise other additives in addition to previously stated components, such as pigments, dyes, heat stabilizers, antioxidants, plasticizers, lubricants, UV-stabilizers, processing aids, foaming agents, and the like in order to further improve the properties, including processability, of the resin composition.

This invention is further illustrated, but is not intended to be limited, by following examples in which all parts are by weight.

EXAMPLE 1

Preparation of graft copolymer [Component (A)]

100 parts of butadiene, 120 parts of demineralized water, 0.2 parts of sodium laurylsulfate and 0.2 parts of t-dodecyl mercaptane were added into a batch reactor. At 70° C., 0.1 part of potassium persulfate was added therein to polymerize for 9 hours. As a result, polybutadiene latex was obtained.

Next, 50 parts of the resulting polybutadiene latex (solid content), 200 parts of demineralized water, 30 parts of styrene, 10 parts of acrylonitrile, 10 parts of N-phenyl maleimide, 0.3 parts of sodium laurylsulfate and 0.2 parts of t-dodecyl mercaptan were added into another reactor. At 70° C., 0.1 part of potassium persulfate was added therein to polymerize for 3 hours. The resulting graft copolymer was passed through a post-treatment to form dry powders. This copolymer was designated ABS-1.

EXAMPLE 2

Preparation of graft copolymer [Component (A)]

This graft copolymer was prepared in the same manner as described in Example 1 except that N-phenyl maleimide was excluded. The resulting graft copolymer was designated ABS-2.

EXAMPLE 3

Preparation of copolymer [Component (B)]

65 parts of styrene, 15 parts of acrylonitrile, 20 parts of N-phenylmaleimide, and 0.5 parts of t-dodecyl mercaptane were added into a batch reactor and polymerized at 70° C. for 10 hours using emulsion polymerization. The resulting copolymer of Component (B) was obtained and designated PMI-SAN.

EXAMPLE 4

60 parts of the graft copolymer ABS-1, 40 parts of the copolymer PMI-SAN, and 20 parts of DE-79 (octabromodiphenyl oxide, manufactured by Great Lakes Chemical in U.S.A.) as the organic flame retardant were mixed uniformly with 5.0 parts of antimony trioxide, 2.0 parts of thermoplastic phenoxy resin, 1.0 part of calcium stearate and 1.0 part of diphenyl isocytl phosphite as a stabilizer in a Henschel mixer and extruded into pellets.

In order to observe the fluidity of the resulting resin composition, some of the pellets were dried for 2 hours in a hot air-dryer at 80° C. The melt-viscosity was determined by a Capillary Rheometer (Instron Co.) at 220° C. and a shear rate of 200 sec$^{-1}$.

In order to examine the flame retardance of the resulting resin composition, test specimens measuring 5 inches by ½ inch by ⅛ inch were prepared by injection molding at 220° C. Tests for flame retardance were carried out according to Vertical Test for V-0, V-1 and V-2 of UL-94.

The heat deflection temperature was measured for injection molded specimens according to ASTM D648. The results are shown in Table 2.

EXAMPLE 5

Test specimens were prepared in the same manner as described in Example 4, except that ABS-2 was used in place of ABS-1 (see Table 1). Tests were carried out in accordance with the procedures in Example 4. The results are shown in Table 2.

Comparative Example 1

Test specimens were prepared in the same manner as described in Example 4, except that conventional SAN was used in place of PMI-SAN (see Table 1). Tests were carried out in accordance with the procedures in Example 4. The results are shown in Table 2.

Comparative Example 2

Test specimens were prepared in the same manner as described in Example 4, except that thermoplastic phenoxy resin was not used (see Table 1). Tests were carried out in accordance with the procedures in Example 4. The results are shown in Table 2.

TABLE 1

| | ABS-1 [Component] [A] | ABS-2 [Component] [A] | PMI-SAN [Component] [B] | SAN | DE-79 (Flame Retardant) | Antimony trioxide | Phenoxy resin |
|---|---|---|---|---|---|---|---|
| Example 4 | 60 | — | 40 | — | 20 | 5.0 | 2.0 |
| Example 5 | — | 60 | 40 | — | 20 | 5.0 | 2.0 |
| Comparative Example 1 | — | 60 | — | 40 | 20 | 5.0 | 2.0 |
| Comparative Example 2 | 60 | — | 40 | — | 20 | 5.0 | — |

TABLE 2

| | Heat Deflection Temperature | Flame Retardance UL-94 ⅛ inch | Flame Dripping | Melt Viscosity 220° C. 200 sec$^{-1}$ (poise) |
|---|---|---|---|---|
| Example 4 | 92 | V-0 | Not observed | 8,340 |
| Example 5 | 86 | V-0 | Not observed | 7,130 |
| Comparative Example 1 | 75 | V-0 | Not observed | 6,230 |
| Comparative Example 2 | 92 | V-2 | Extreme | 9,790 |

We claim:

1. A heat resistant and flame retardant resin composition, comprising
   (A) a graft copolymer prepared by copolymerizing a rubber copolymer and one or more monomers selected from the group consisting of aromatic monoalkenyl monomers, vinylcyan monomers, alkylester monomers of acrylic acid, alkylester monomers of methacrylic acid, maleic anhydride monomers and N-substituted maleimide monomers;
   (B) a copolymer prepared by copolymerizing one or more monomers selected from the group consisting of aromatic monoalkenyl monomers, vinylcyan monomers, alkylester monomers of acrylic acid, and alkylester monomers of methacrylic acid, with a monomer selected from the group consisting of maleic anhydride monomers and N-substituted maleimide monomers;
   (C) an organic flame retardant;
   (D) antimony trioxide; and
   (E) a thermoplastic phenoxy resin;
wherein said graft polymer (A) and copolymer (B) are present in a ratio of 5:95 to 95:5 parts by weight in the resin composition.

2. The resin composition according to claim 1, wherein the ratio of graft polymer (A) to copolymer (B) is from 10:90 to 90:10 parts by weight.

3. The resin composition according to claim 1, wherein the ratio of graft polymer (A) to copolymer (B) is from 15:85 to 85:15 parts by weight.

4. The resin composition according to claim 1, wherein the organic flame retardant is selected from the group consisting of aromatic compounds containing halogens, aliphatic compounds containing halogens and cycloaliphatic compounds containing halogens.

5. The resin composition according to claim 1, wherein the rubber component is selected from the group consisting of butadiene type rubbers, isoprene type rubbers, copolymers of diene monomers and styrene monomers, and alkylacrylate rubbers.

6. The resin composition according to claim 1, wherein the rubber component is present in an amount of 5 to 70% by weight of the graft copolymer (A).

7. The resin composition according to claim 1, wherein the rubber component has a particle size of 0.1 to 1.5 μm.

8. The resin composition according to claim 1, wherein the monomers of the graft of copolymer (A) are present in an amount of 30 to 95% by weight of the graft copolymer (A).

9. The resin composition according to claim 1, wherein the organic flame retardant is present in an amount of 5 to 40% by weight of the resin composition.

10. The resin composition according to claim 1, wherein the antimony trioxide is present in an amount of 1 to 20% by weight of the resin composition.

11. The resin composition according to claim 1, wherein the thermoplastic phenoxy resin is present in an amount of 0.01 to 5% by weight of the resin composition.

* * * * *